United States Patent
Uzawa

[11] Patent Number: 5,285,317
[45] Date of Patent: Feb. 8, 1994

[54] ZOOM LENS SYSTEM
[75] Inventor: Tsutomu Uzawa, Tokyo, Japan
[73] Assignee: Olympus Optical Co., Ltd., Tokyo, Japan
[21] Appl. No.: 793,112
[22] Filed: Nov. 18, 1991
[30] Foreign Application Priority Data
  Nov. 22, 1990 [JP] Japan ............ 2-320262
[51] Int. Cl.$^5$ ............ G02B 15/14
[52] U.S. Cl. ............ 359/676; 359/686; 359/687
[58] Field of Search ............ 359/676, 680–682, 359/686, 687–690, 675, 771, 772, 774, 676–677, 683, 685

[56] References Cited
U.S. PATENT DOCUMENTS

| | | | |
|---|---|---|---|
| 4,634,236 | 1/1987 | Masumoto | 359/687 |
| 4,662,724 | 5/1987 | Moriyama | 359/687 |
| 4,666,257 | 5/1987 | Tanaka et al. | 359/686 |
| 4,695,133 | 9/1987 | Kitagishi et al. | 359/687 |
| 4,696,553 | 9/1987 | Tsuji et al. | 359/687 |
| 4,708,443 | 11/1987 | Goto et al. | 359/687 |
| 4,756,608 | 7/1988 | Itoh | 359/687 |
| 4,789,226 | 12/1988 | Ogata | 359/687 |
| 5,000,551 | 3/1991 | Shibayama | 359/687 |

FOREIGN PATENT DOCUMENTS
60-14212  1/1985  Japan .

Primary Examiner—Bruce Y. Arnold
Assistant Examiner—Thong Nguyen
Attorney, Agent, or Firm—Cushman, Darby & Cushman

[57] ABSTRACT

A compact four-unit type of zoom lens system particularly suited for video cameras. The zoom lens system has a variable power ratio of about 6-8 and is made up of a reduced number of about 9-11 lenses. This zoom lens system comprises a first lens unit I having a positive refractive power, a second lens unit II having a negative refractive power, a third lens unit III having a positive refractive power and a fourth lens unit IV having a positive refractive power. The first and third lens units I and III are movable toward the object side for zooming from the wide angle end to the telephoto end while the second lens unit II remains fixed. The fourth lens unit IV is movable for correcting image position variations. The third lens unit III includes at least one positive lens element and one negative lens element with a concave surface facing the fourth lens unit IV. The fourth lens unit IV includes one positive lens element and may further include one negative lens element.

16 Claims, 13 Drawing Sheets

ZOOM LENS SYSTEM

BACKGROUND OF THE INVENTION

1. Field of the Invention

The present invention relates to a four-unit type of zoom lens system lending itself well fit for still cameras, cinecameras or other cameras, esp., video cameras and, more specifically, to a compact zoom lens arrangement comprising a reduced number of lenses and having a variable power ratio of about 6-8.

2. Description of the Prior Art

In recent years, video cameras have been smaller in size and lower in price than ever before and, with this, zoom lenses for video cameras are now required to get ever smaller and ever more inexpensive.

In most cases, zoom lenses having a variable power ratio of 6 or more for video cameras, available so far in the art, are of a four-unit type built up of, in order from the object side, positive, negative, negative and positive lens units, with the overall lens length kept constant during zooming, the 2nd lens unit used for power variation and the 3rd lens unit intended for image position correction.

With demand for lens miniaturization in mind, however, some zoom lens systems for video cameras—which are variable in the overall lens length during zooming and are generally designed such that the overall lens length is minimized at the wide angle end have been proposed in JP-P-61(1986)-55653, JP-A-58(1983)-179809 and JP-A-60(1985)-14212.

However, these zoom lens systems each consist of as large as 13 to 15 lenses. For lens systems for cameras using small-sized image sensors, typically video cameras, the more the number of lenses used, the more difficult it is to assure a space large enough to accommodate such lenses, thus offering an obstacle to their miniaturization. This problem becomes more serious as the image sensors get smaller.

SUMMARY OF THE INVENTION

Having been accomplished in view of the above-mentioned problem, this invention seeks to provide a more compact zoom lens system consisting of a reduced number of lenses and having a variable power ratio lying in the range of about 6-8.

According to one aspect of this invention, there is provided a zoom lens system characterized by comprising a first lens unit having a positive refractive power, a second lens unit having a negative refractive power, a third lens unit having a positive refractive power and a fourth lens unit having a positive refractive power, said first and third lens units being movable toward the object side for zooming from the wide angle end to the telephoto end while said second lens unit remains fixed, said fourth lens unit being movable for correcting image position variations, and said fourth lens unit being made up of one positive lens element with or without one negative lens element.

According to another aspect of this invention, there is provided a zoom lens system characterized by comprising a first lens unit having a positive refractive power, a second lens unit having a negative refractive power, a third lens unit having a positive refractive power and a fourth lens unit having a positive refractive power, said first and third lens units being movable toward the object side for zooming from the wide angle end to the telephoto end while said second lens unit remains fixed, said fourth lens unit being movable for correcting image position variations, and said third lens unit being made up of at least one positive lens element and one negative lens element with the concave surface facing said fourth lens unit.

According to a further aspect of this invention, there is provided a zoom lens system characterized by comprising a first lens unit having a positive refractive power, a second lens unit having a negative refractive power, a third lens unit having a positive refractive power and a fourth lens unit having a positive refractive power, said first and third lens units being movable toward the object side for zooming from the wide angle end to the telephoto end while said second lens unit remains fixed, said fourth lens unit being movable for correcting image position variations, said third lens unit being made up of at least one positive lens element and one negative lens element with the concave surface facing said fourth lens unit, and said fourth lens unit being made up of one positive lens element with or without one negative lens element.

The foregoing zooming and focusing type of zoom lens systems according to this invention are all not only favorable to make the lenses in a smaller and more compact form—because the overall lengths are minimized at the wide angle ends, but advantageous to make the front lenses and the overall lens systems smaller in size as well—because the fourth lens unit has a focusing action.

In order to achieve further reductions in the size and cost of the lenses, it is desired to remove less effective lenses as much as possible or, to put it another way, constitute the zoom lens system with the required but minimum number of lenses. To this end, it is necessary to achieve a breakthrough in the makeup of the 3rd or 4th lens unit which plays a major role in image formation. In the zoom lens system of this invention, the principle point position of the 3rd lens unit is located as closely to the object side as possible by allowing the lens of the 3rd lens unit proximate to the object side to have a positive refractive power and the lens thereof proximate to the image side to have a negative refractive power. In addition, to effect focusing with the 4th lens unit, the 1st to 3rd lens units are formed together into a substantially afocal system wherein a divergent beam leaving the 2nd lens unit is converted into a parallel and then convergent beam through one or more object-side positive lenses of the 3rd lens unit, and the convergent beam is again converted into a substantially parallel beam through the image-side negative lens of 3rd lens unit, whence it is then incident on the 4th lens unit. In other words, the 3rd lens unit not only plays an "erector" role in converting the divergent beam into the parallel beam but also serves as telephoto afocal converter. After fully converged through the 3rd lens unit, the convergent beam leaves it in a substantially afocal manner, incident on the 4th lens unit at an on-axial beam position so low that the 4th lens unit can be miniaturized and simplified. More illustratively, the 4th lens unit may be made up of one positive lens. In order to achieve more satisfactory correction of chromatic aberration of magnification, an additional negative lens may be provided. Furthermore, an aspherical lens having a positive refractive power decreasing as it separates away from the optical axis is located in the 3rd or 4th lens unit so as to correct spherical aberration and coma.

The object of this invention can in principle be attained by what has been described above. More preferably, however, the zoom lens system of this invention should satisfy the following conditions:

$$0.5 < f_3/f_4 < 2.0 \tag{1}$$

$$-0.2 < \beta_{4S} < 0.5 \tag{2}$$

$$0.4 < (r_{3F}+r_{3R})/(r_{3F}-r_{3R}) < 2.7 \tag{3}$$

wherein:

$f_3$ and $f_4$ are the focal lengths of the 3rd and 4th lens units, respectively, $\beta_{4S}$ is the image-formation magnification of the 4th lens unit at the geometrical mean of the focal lengths at the wide angle and telephoto ends, and $r_{3F}$ and $r_{3R}$ are the object- and image-side radii of curvature of a negative lens in the 3rd lens unit, respectively.

Concerning lens miniaturization, Condition (1) defines the power layouts of 3rd and 4th lens unit. At more than the upper limit of Condition (1) difficulty is encountered in achieving overall-length reductions, while at less than the lower limit overall-length reductions is advantageously achieved but difficulty is involved in correcting various forms of aberrations, esp. spherical aberration and coma.

Condition (2) defines what must be satisfied when focusing is carried out with the 4th lens unit, and provides a numerical definition of constructing a substantially afocal system with the 1st to 3rd lens units. Values more and less than the upper and lower limits of Condition (2) are unpreferred because the amount of movement of the 4th lens unit for focusing is not only too large but there is also a large variation in aberration due to focusing.

Concerning the shape of a negative lens in the 3rd lens unit, Condition (3) defines what must be satisfied for lens miniaturization and aberration correction. Values less than the lower limit of Condition (3) are unpreferred because, for one, they gives rise to insufficient correction of spherical aberration with too large an increase in inward coma aberration; for another, they are unfavorable to lens miniaturization. Values higher than the upper limit of Condition (3) are again unpreferred because over-correction of spherical aberration takes place with too large an increase in outward coma aberration.

More preferably, the following conditions (4) and (5) should be satisfied for aberration correction.

$$0.2 < r_{3R}/(n_{3R}-1)(f_W f_T)^{\frac{1}{2}} < 1.0 \tag{4}$$

$$0.2 < r_{4F}/(n_{4F}-1)(f_W f_T)^{\frac{1}{2}} < 2.0 \tag{5}$$

wherein:

$r_{3R}$ is the radius of curvature of the image-side surface of a negative lens in the 3rd lens unit, $n_{3R}$ is the refractive index of a negative lens in the 3rd lens unit, $r_{4F}$ is the radius of curvature of the surface of the 4th lens unit that is proximate to the object side, $n_{4F}$ is the refractive index of the lens of the 4th lens unit that is proximate to the object side, $f_W$ is the focal length of the overall system at the wide angle end, and $f_T$ is the focal length of the overall system at the telephoto end.

Condition (4) correlates with Condition (3), and provides a definition of the negative lens in the 3rd lens unit. A deviation from this condition is unpreferred, especially because there is too large an increase in coma aberration.

Condition (5) concerns correction of aberrations effected by the 4th lens unit, mainly off-axial aberration and esp., coma and astigmatism. Values less and more than the lower and upper limits of Conditions (5) are unpreferred, because in the former instance there is an increase in inward coma aberration with a tilting-down of both the sagittal and meridional image surfaces on the minus sides and in the latter instance there is an increase in outward coma aberration with a tilting-down of both the sagittal and meridional images surfaces on the plus sides.

Concerning the movement of the 4th lens unit during magnification power variation, it is desired that the following condition (6) that correlates with Condition (2) should be satisfied.

$$\beta_{4S} < \beta_{4W}, \text{ and } \beta_{4S} < \beta_{4T} \tag{6}$$

wherein $\beta_{4W}$ and $\beta_{4T}$ are the image-formation magnifications of the 4th lens unit at the wide angle and telephoto ends, respectively.

Condition (6) provides a definition of the change of magnification of the 4th lens unit in a power-variable region, representing that the magnification of the 4th lens unit may be minimized in some power-variable region other than the wide angle and telephoto ends. In other words, this condition implies that for magnification power variation from the wide angle end to the telephoto end, the 4th lens unit is first moved toward the object side and then changes direction for movement toward the image side. With Condition (6) satisfied, it is possible to reduce the amount of movement of the 4th lens unit, thereby reducing an aberrational fluctuation due to magnification power variation.

In addition, the 1st and 3rd lens units may be designed to be moved as a single unit on the optical axis so as to decrease the diameter of the lens of the entire system that is proximate to the object side (the front lens's diameter) and for the purpose of correcting aberrations.

In order to correct a fluctuation of chromatic aberration due to magnification power variation, it is preferred to incorporate at least one negative lens and at least one positive lens into the 1st and 2nd lens units, respectively.

Moreover, the lens system of this invention enables the power variation to be effected with high efficiency and so is favorable for high power variation, because the 2nd lens unit enables power variation to take place in a range including a magnification of $-1$.

An additional advantage with constructing the 1st and 3rd lens units such that they are movable as a single unit on the optical axis is that the framework can be simplified.

It is noted that even when lenses using heterogeneous media, Fresnel lenses, holographic optoelements, etc. are used in place of the aspherical lenses of the 3rd and 4th lens units, similar effects are acheivable.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

Figure 1:
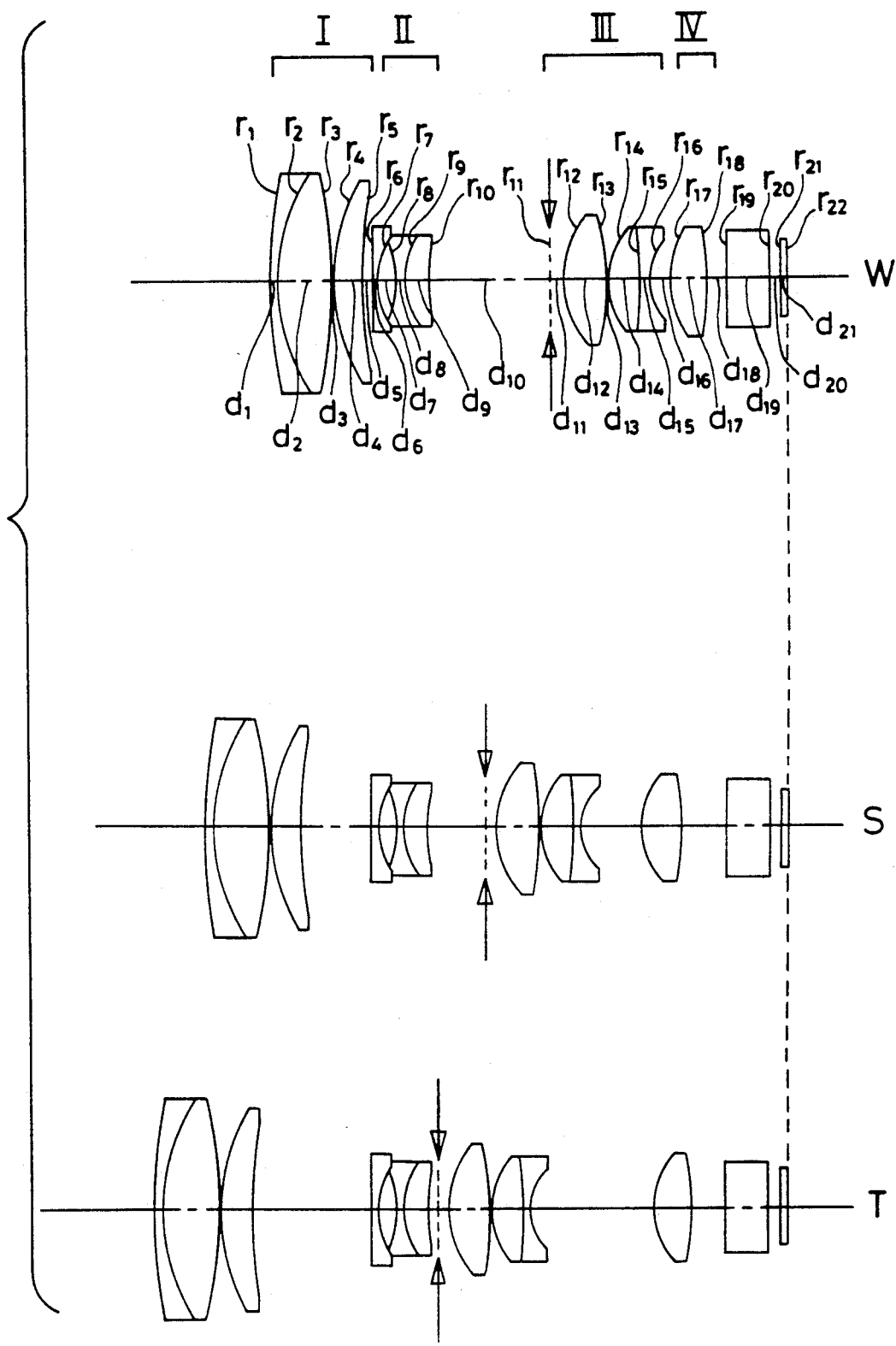
FIGS. 1 to 6 are sectional views of Examples 1 to 6 of the zoom lens system according to this invention.
Figure 2:
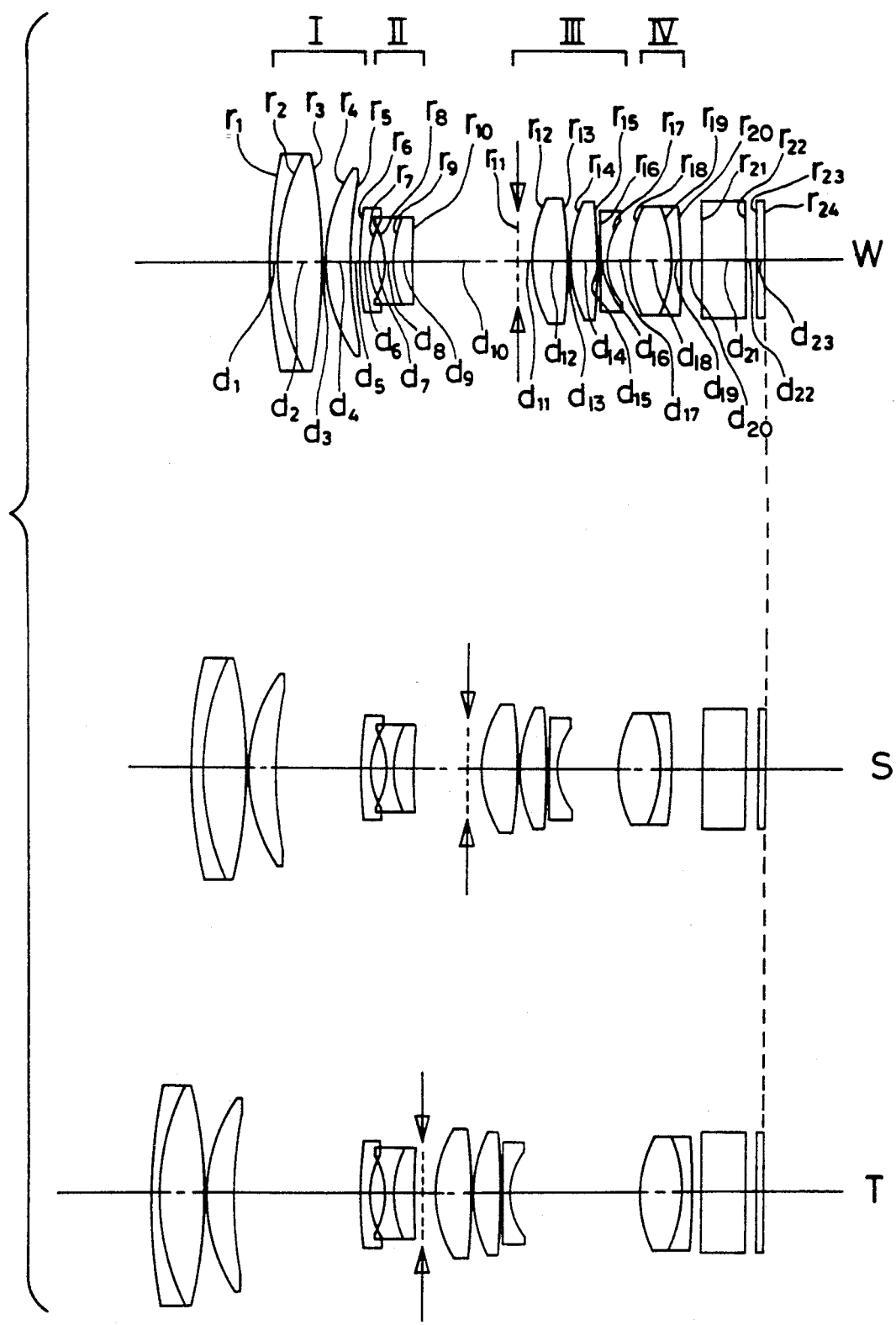
Figure 3:
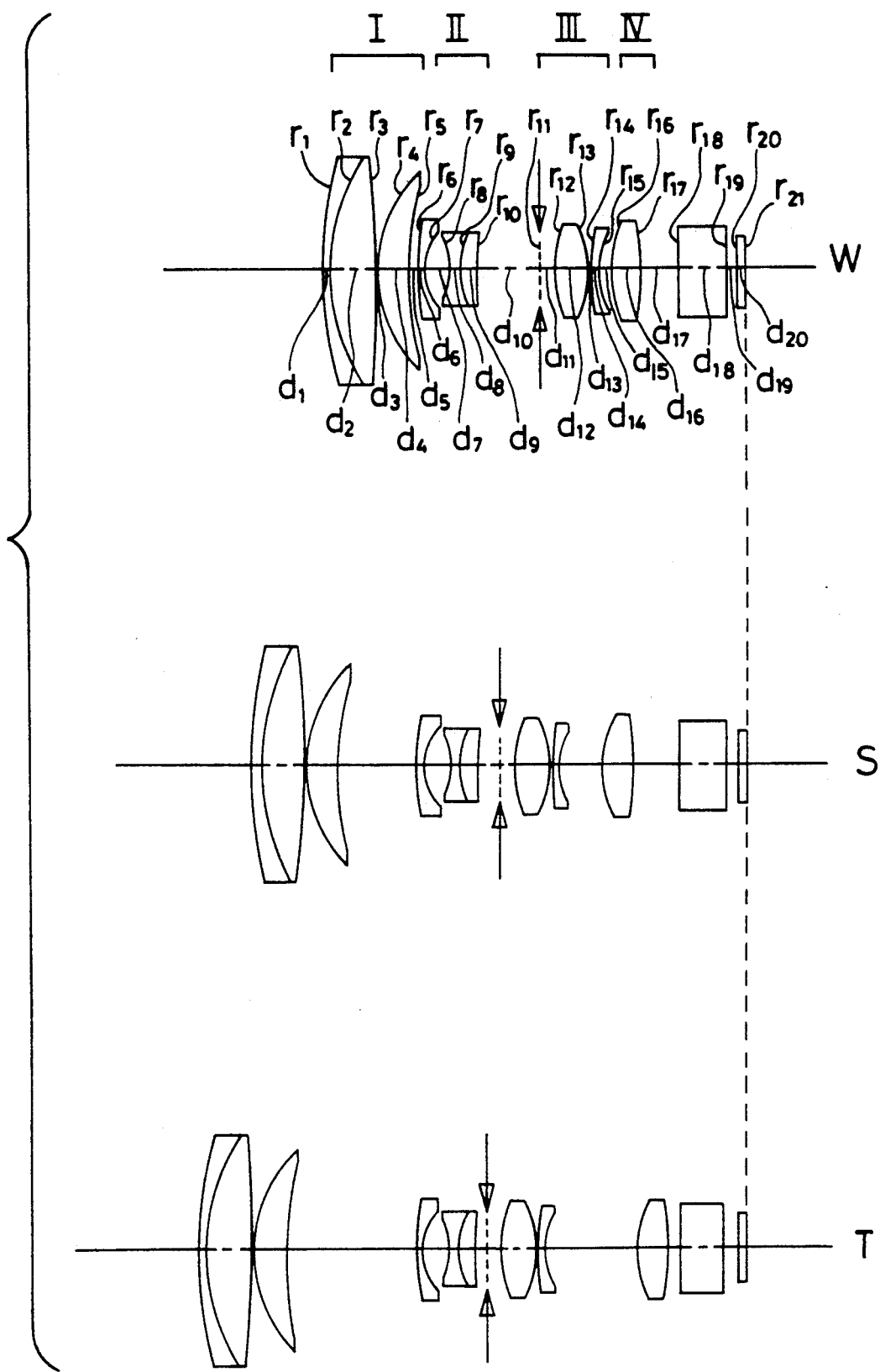
Figure 4:
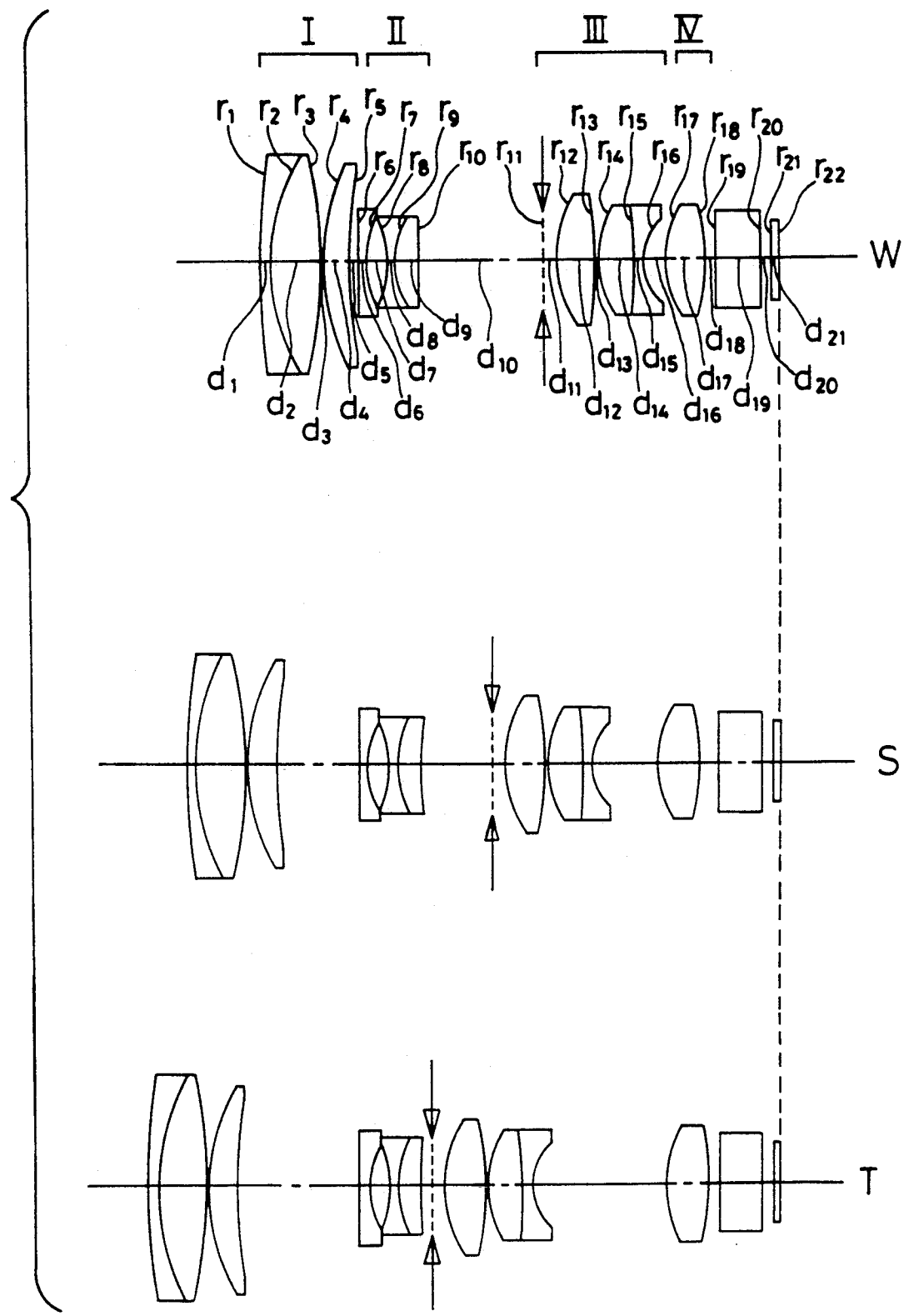
Figure 5:
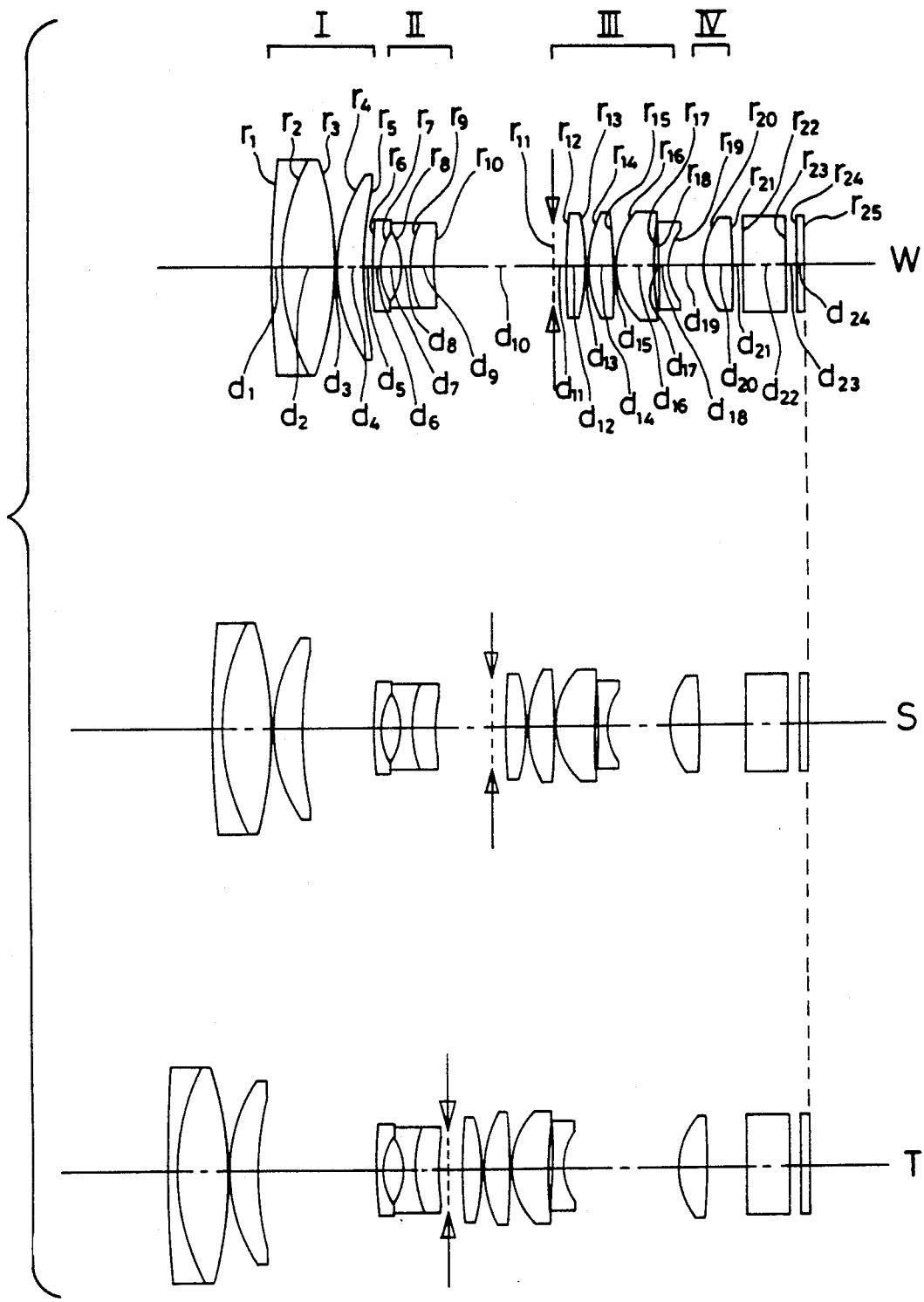
Figure 6:
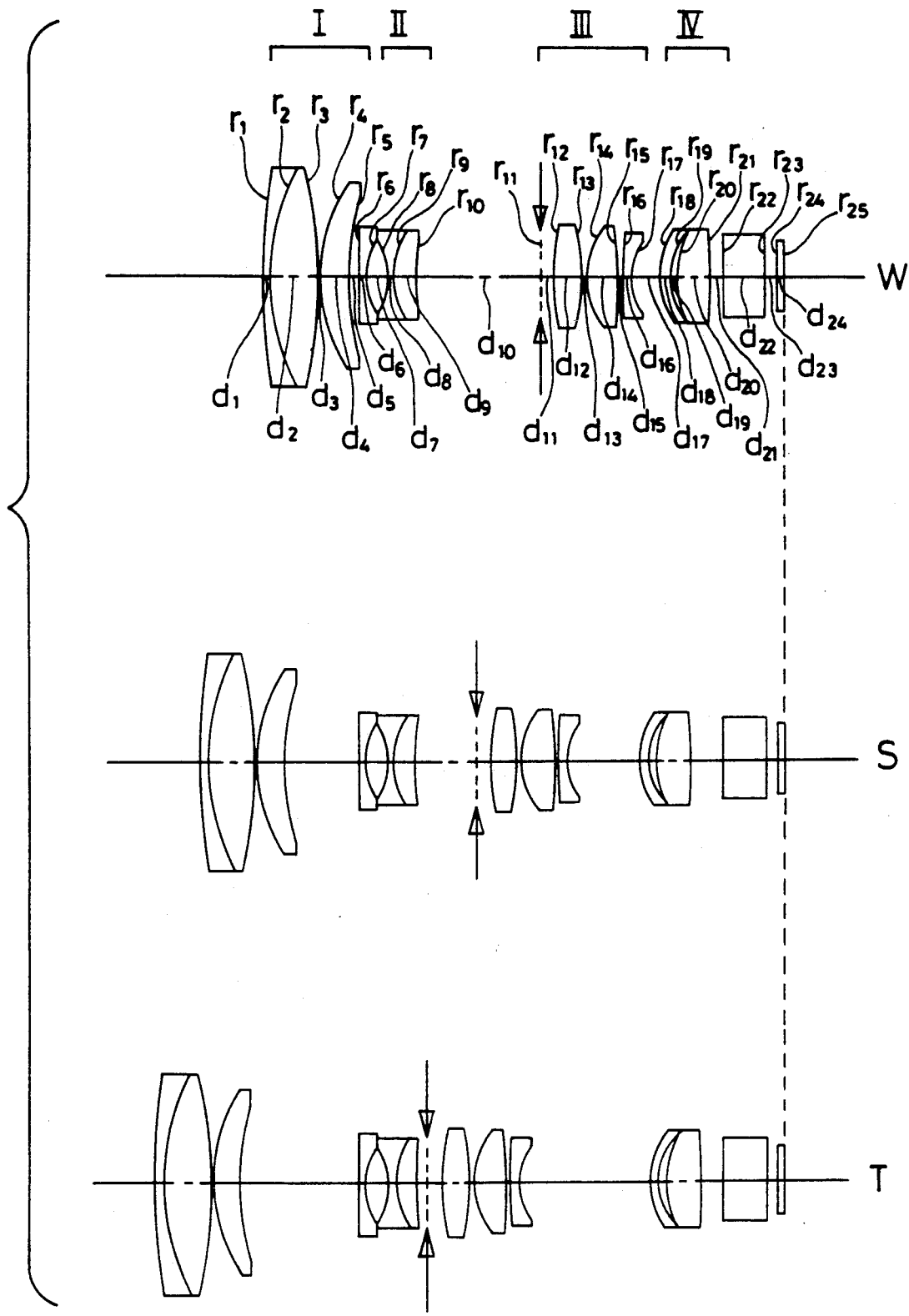
Figure 7:
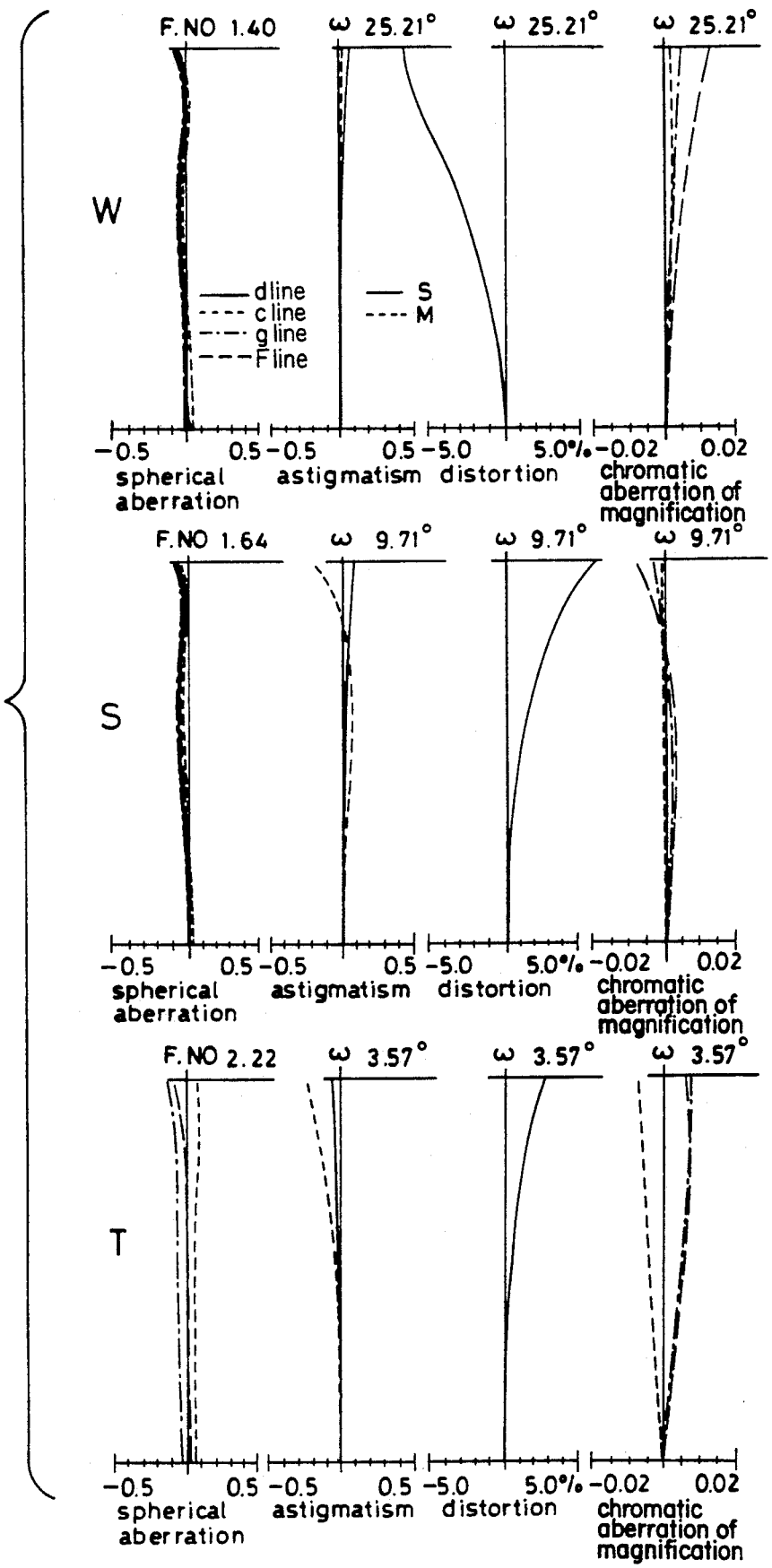
FIGS. 7 to 12 are aberrational diagrams of Examples 1 to 6.
Figure 8:
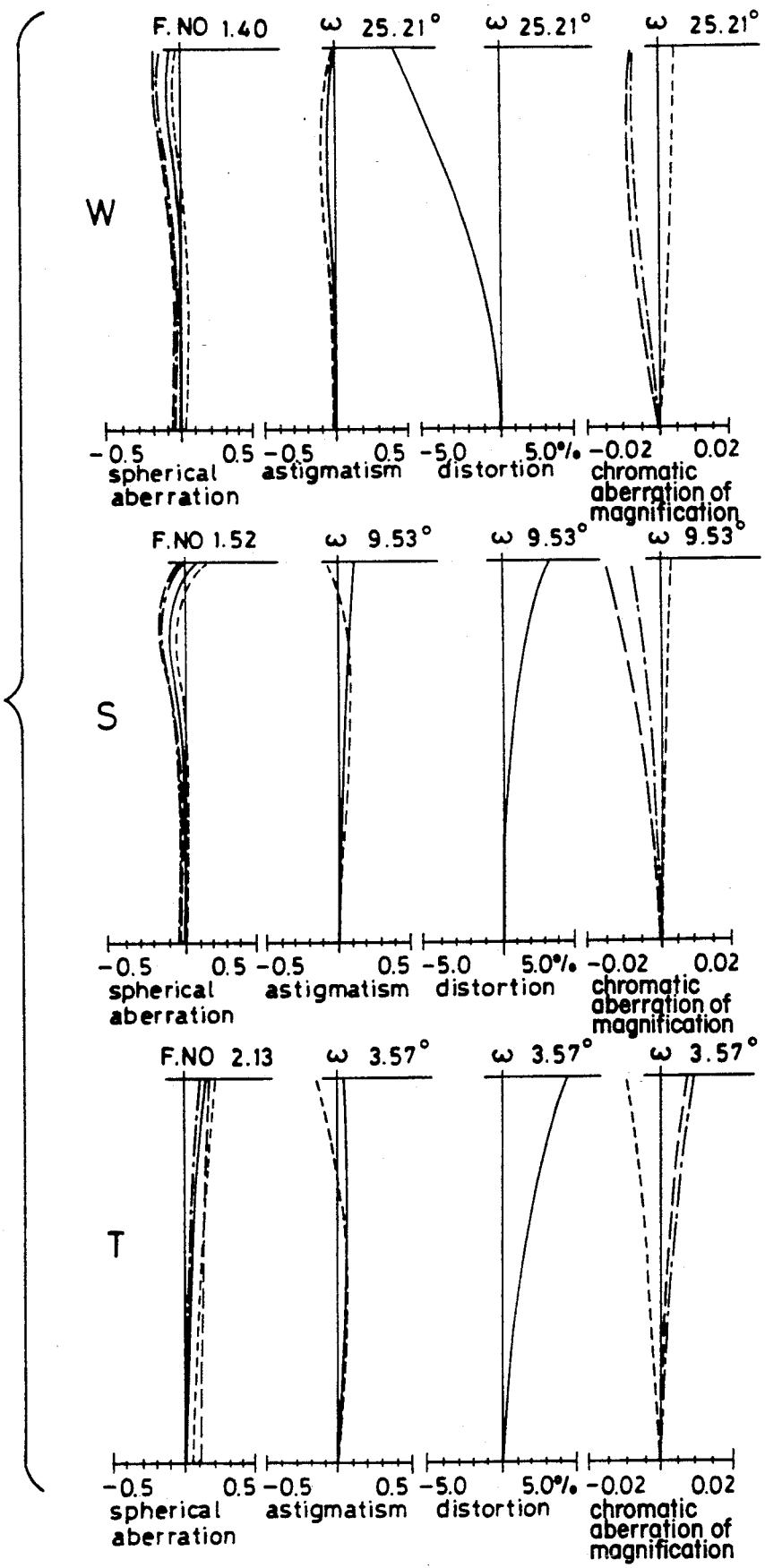
Figure 9:
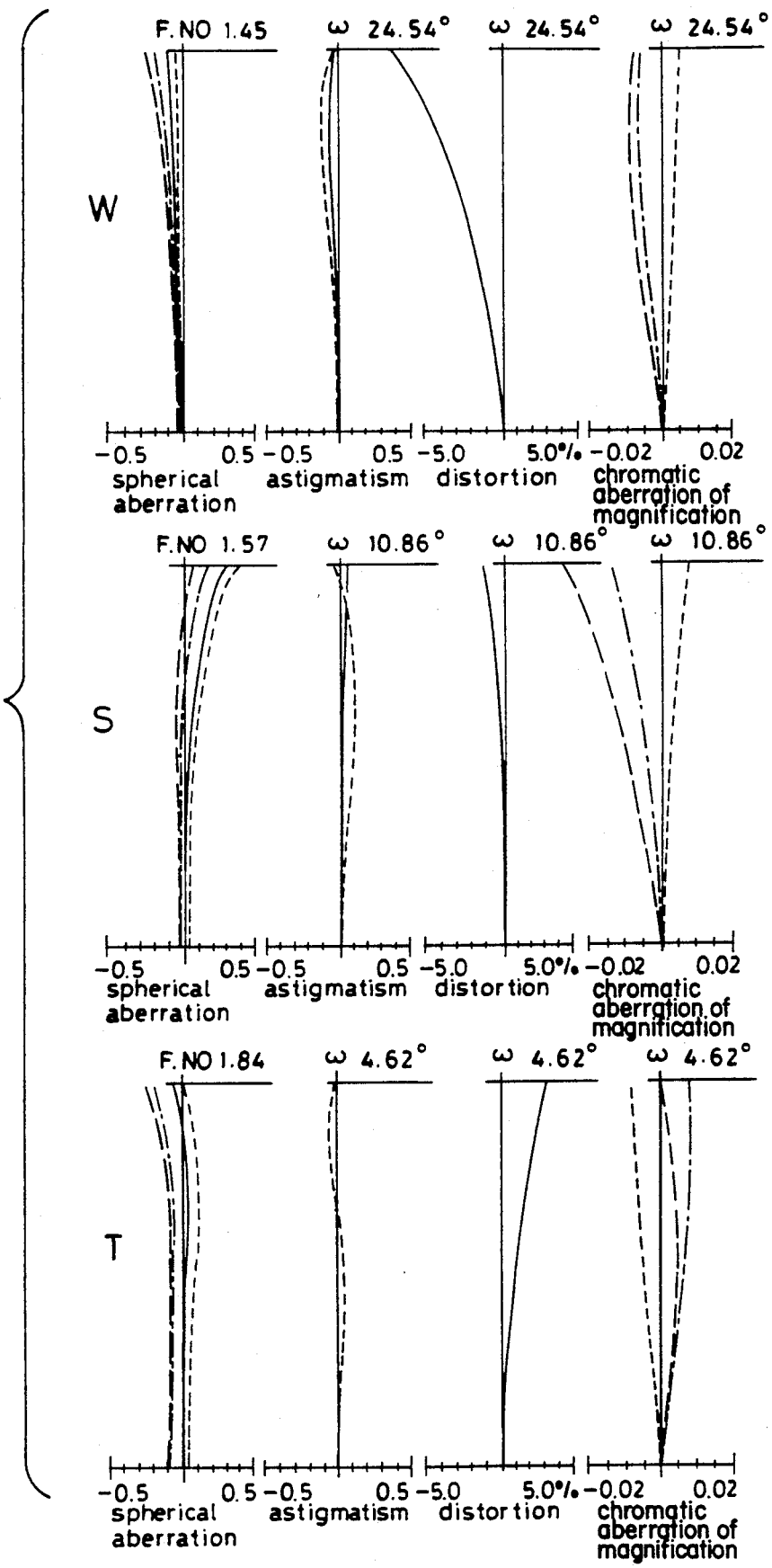
Figure 10:
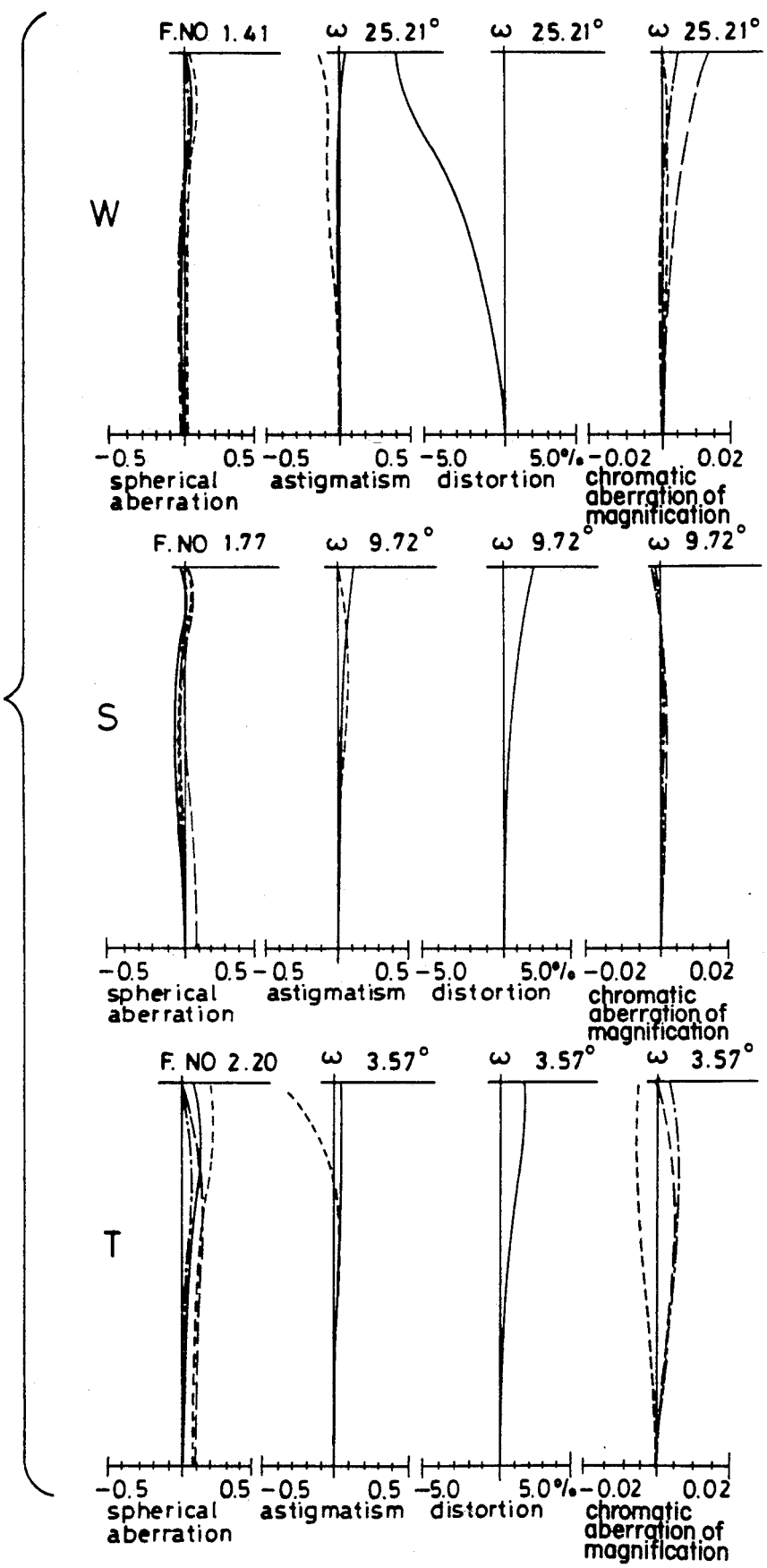
Figure 11:
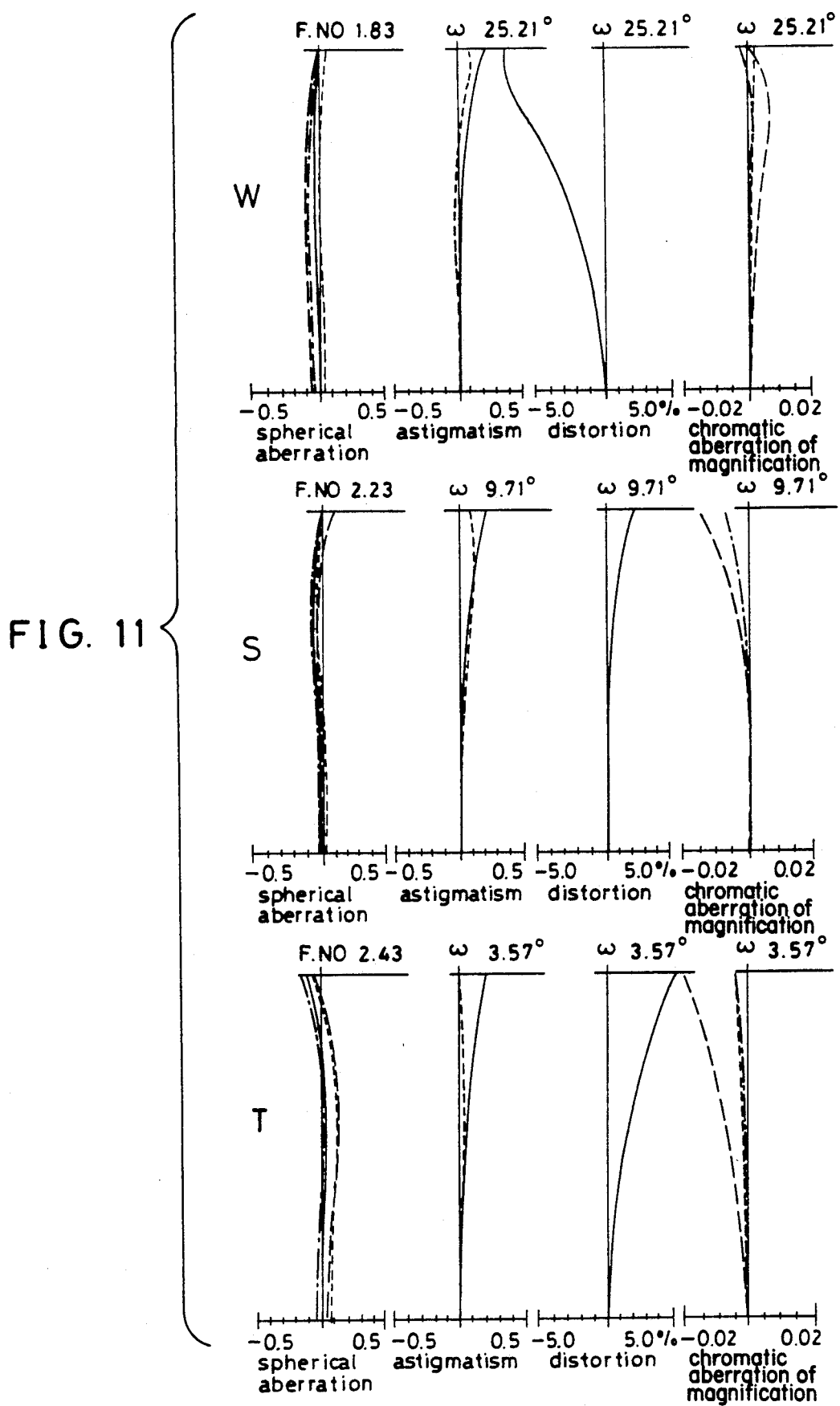
Figure 12:
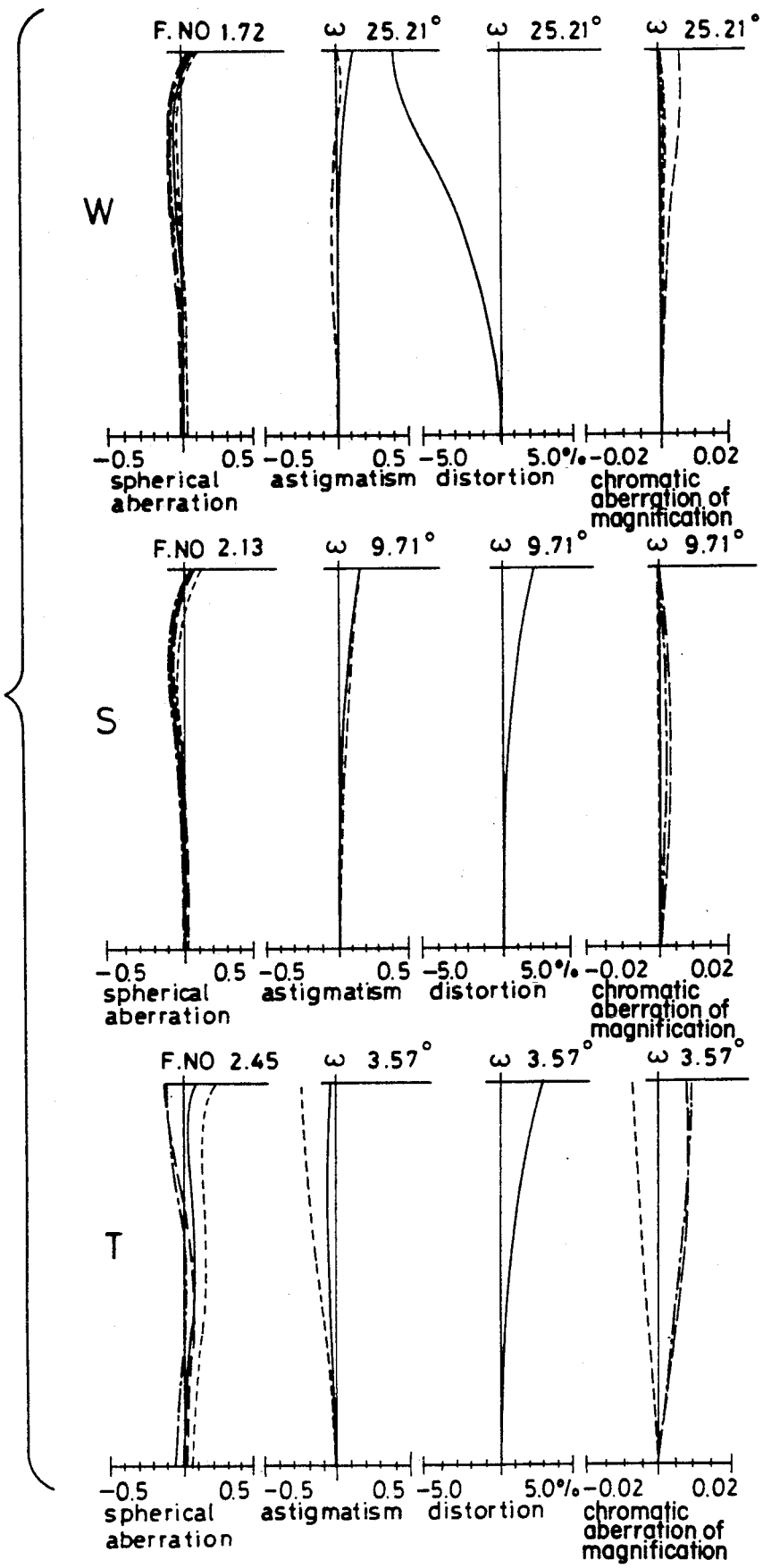

Usually, distortion is expressed in terms of the ratio of a difference between the paraxial image formation magnification and the image formation magnification of an image portion having a specific field angle to the paraxial image formation magnification. In more conventional wording, such a figure is expressed as a percentage. The distortion at that field angle is 5%, meaning that the image is formed at that field angle on a 5% enlarged scale.

DESCRIPTION OF THE PREFERRED EMBODIMENTS

The present invention will now be explained with reference to the following Examples 1 to 6. The sections of lenses of Examples 1–6 at the wide angle ends (W), standard settings (S) and telephoto ends (T). Note that the lens data of Examples 1–6 will be described later. In Examples 4, 5 or 6 of these examples, the 1st and 3rd lens units I and III are movable as a single unit. In either case, the 1st lens unit I is made up of three lenses, i.e., a negative meniscus lens cemented to a double-convex positive lens and a positive meniscus lens. The 2nd lens unit II is made up of three lenses, i.e., a negative lens (Example 1) or a negative meniscus lens (Examples 2–6) and a double-concave negative lens cemented to a positive lens. The 3rd lens unit III is made up of three lenses, i.e., a double-convex positive lens and a double-convex positive lens cemented to a double-concave negative lens in Example 1 or 4; three lenses, i.e., two positive lenses and one negative meniscus lens in Example 2 or 6; and two lenses, i.e., one positive lens and one negative meniscus lens in Example 3; and four lenses, i.e., two double-convex positive lenses, one positive meniscus lens and one double-concave negative lens in Example 5. The 4th lens unit IV is made up of one double-convex positive lens in example 1, 3, 4 or 5; a double-convex positive lens cemented to a negative meniscus len in Example 2; and two lenses, i.e., a negative meniscus lens and a double-convex positive lens. In either case, a diaphragm is integrally provided on the object side of the 3rd lens unit III and movable therewith on the optical axis. As can be understood from the foregoing, the total number of lenses is 10 in Example 1 or 4; 11 in Example 2, 5 or 6; and 9 in Example 3. It is here noted that in Example 1, 2, 3 or 4, the surface of the 3rd lens unit III that is proximate to the object side and the surface of the 4th lens unit that is proximate to the object side are made aspherical; in Example 5, only the surface of the 4th lens unit that is proximate to the object side is made aspherical; and in Example 6 only the surface of the 3rd lens unit that is proximate to the object side is made aspherical.

In the data set out below, other symbols have the following meanings.

f . . . the focal length of the entire system
$F_{NO}$ . . . the F number
$\omega$ . . . the half-image angle
$r_1, r_2, \ldots$ the radius of curvature of each lens
$d_1, d_2, \ldots$ the surface separation between the adjacent lenses
$n_{d1}, n_{d2}, \ldots$ the refractive indices of each lens on the d line
$\nu_{d1}, \nu_{d2}, \ldots$ the Abbe's number of each lens Now letting x and y denote the axial direction and the direction normal thereto, respectively, the aspherical shape is represented by $$x = (y^2/r)/[1 + \{1 - P(y^2/r^2)\}^{\frac{1}{2}}] + A_4 y^4 + A_6 y^6 + A_8 y^8$$

wherein:
r is the paraxial radius of curvature,
P is the conical coefficient, and
$A_4$, $A_6$ and $A_8$ are the aspherical coefficients.

Example 1

$f = 6.69 \sim 18.4 \sim 50.5$
$F_{NO} = 1.40 \sim 1.64 \sim 2.22$
$\omega = 25.21 \sim 9.71 \sim 3.57°$

| | | | |
|---|---|---|---|
| $r_1 = 60.5085$ | $d_1 = 1.0000$ | $n_{d1} = 1.78472$ | $\nu_{d1} = 25.71$ |
| $r_2 = 22.1594$ | $d_2 = 5.7000$ | $n_{d2} = 1.62230$ | $\nu_{d2} = 53.20$ |
| $r_3 = -56.4987$ | $d_3 = 0.1500$ | | |
| $r_4 = 21.9490$ | $d_4 = 3.3000$ | $n_{d3} = 1.60311$ | $\nu_{d3} = 60.70$ |
| $r_5 = 66.4458$ | $d_5 =$ (Variable) | | |
| $r_6 = -227.5863$ | $d_6 = 0.9000$ | $n_{d4} = 1.71300$ | $\nu_{d4} = 53.84$ |
| $r_7 = 10.3888$ | $d_7 = 2.3000$ | | |
| $r_8 = -10.4469$ | $d_8 = 0.8000$ | $n_{d5} = 1.71300$ | $\nu_{d5} = 53.84$ |
| $r_9 = 8.6473$ | $d_9 = 2.7000$ | $n_{d6} = 1.84666$ | $\nu_{d6} = 23.88$ |
| $r_{10} = 50.5924$ | $d_{10} =$ (Variable) | | |
| $r_{11} = \infty$ (Stop) | $d_{11} = 1.5000$ | | |
| $r_{12} = 10.5146$ (Aspheric) | $d_{12} = 4.4000$ | $n_{d7} = 1.71300$ | $\nu_{d7} = 53.84$ |
| $r_{13} = -39.3761$ | $d_{13} = 0.2000$ | | |
| $r_{14} = 10.3692$ | $d_{14} = 3.9840$ | $n_{d8} = 1.71300$ | $\nu_{d8} = 53.84$ |
| $r_{15} = -54.1837$ | $d_{15} = 0.9867$ | $n_{d9} = 1.78472$ | $\nu_{d9} = 25.71$ |
| $r_{16} = 5.3437$ | $d_{16} =$ (Variable) | | |
| $r_{17} = 8.4466$ (Aspheric) | $d_{17} = 4.7000$ | $n_{d10} = 1.48749$ | $\nu_{d10} = 70.20$ |
| $r_{18} = -17.4389$ | $d_{18} =$ (Variable) | | |
| $r_{19} = \infty$ | $d_{19} = 5.1000$ | $n_{d11} = 1.54771$ | $\nu_{d11} = 62.83$ |
| $r_{20} = \infty$ | $d_{20} = 1.2100$ | | |
| $r_{21} = \infty$ | $d_{21} = 0.6000$ | $n_{d12} = 1.48749$ | $\nu_{d12} = 70.20$ |

Example 1-continued $r_{22} = \infty$

| Zooming Spaces | | | |
|---|---|---|---|
| f | 6.69 | 18.4 | 50.5 |
| $d_5$ | 1.000 | 9.366 | 13.745 |
| $d_{10}$ | 13.486 | 7.604 | 1.000 |
| $d_{16}$ | 2.200 | 7.086 | 14.686 |
| $d_{18}$ | 1.000 | 1.996 | 1.000 |

| Zooming Spaces | | | |
|---|---|---|---|
| f | 6.69 | 18.78 | 50.47 |
| $d_5$ | 1.000 | 9.638 | 14.350 |
| $d_{10}$ | 11.812 | 6.168 | 1.000 |
| $d_{17}$ | 2.466 | 6.715 | 14.406 |
| $d_{20}$ | 2.128 | 3.523 | 1.000 |

Aspherical Coefficients

12th surface
$P = 1$
$A_4 = -0.14419 \times 10^{-3}$
$A_6 = -0.83553 \times 10^{-6}$
$A_8 = 0.72844 \times 10^{-9}$
17th surface
$P = 1$
$A_4 = -0.23971 \times 10^{-3}$
$A_6 = -0.83744 \times 10^{-6}$
$A_8 = -0.45542 \times 10^{-7}$ Aspherical Coefficients 12th surface
$P = 1$
$A_4 = -0.18935 \times 10^{-3}$
$A_6 = -0.23305 \times 10^{-6}$
$A_8 = -0.13264 \times 10^{-7}$
18th surface
$P = 1$
$A_4 = -0.13448 \times 10^{-3}$
$A_6 = 0.18898 \times 10^{-5}$
$A_8 = -0.40886 \times 10^{-7}$ Example 2

$f = 6.69 \sim 18.78 \sim 50.47$
$F_{NO} = 1.40 \sim 1.49 \sim 2.13$
$\omega = 25.21 \sim 9.53 \sim 3.57°$

| | | | |
|---|---|---|---|
| $r_1 = 50.2819$ | $d_1 = 1.0000$ | $n_{d1} = 1.84666$ | $\nu_{d1} = 23.88$ |
| $r_2 = 24.5517$ | $d_2 = 5.1000$ | $n_{d2} = 1.60311$ | $\nu_{d2} = 60.70$ |
| $r_3 = -68.8981$ | $d_3 = 0.1500$ | | |
| $r_4 = 19.6834$ | $d_4 = 3.2000$ | $n_{d3} = 1.60311$ | $\nu_{d3} = 60.70$ |
| $r_5 = 55.3377$ | $d_5 = $ (Variable) | | |
| $r_6 = 43.4657$ | $d_6 = 0.9000$ | $n_{d4} = 1.69350$ | $\nu_{d4} = 53.23$ |
| $r_7 = 7.4173$ | $d_7 = 2.0000$ | | |
| $r_8 = -8.7246$ | $d_8 = 0.8000$ | $n_{d5} = 1.69350$ | $\nu_{d5} = 53.23$ |
| $r_9 = 10.7211$ | $d_9 = 2.3000$ | $n_{d6} = 1.84666$ | $\nu_{d6} = 23.88$ |
| $r_{10} = 74.0414$ | $d_{10} = $ (Variable) | | |
| $r_{11} = \infty$ (Stop) | $d_{11} = 1.5000$ | | |
| $r_{12} = 10.1707$ (Aspheric) | $d_{12} = 4.1000$ | $n_{d7} = 1.69350$ | $\nu_{d7} = 53.23$ |
| $r_{13} = -51.2962$ | $d_{13} = 0.2000$ | | |
| $r_{14} = 14.3850$ | $d_{14} = 3.0000$ | $n_{d8} = 1.74400$ | $\nu_{d8} = 44.73$ |
| $r_{15} = -99.3361$ | $d_{15} = 0.2000$ | | |
| $r_{16} = 128.4664$ | $d_{16} = 0.9000$ | $n_{d9} = 1.76182$ | $\nu_{d9} = 26.55$ |
| $r_{17} = 6.6124$ | $d_{17} = $ (Variable) | | |
| $r_{18} = 10.3061$ (Aspheric) | $d_{18} = 4.8000$ | $n_{d10} = 1.69350$ | $\nu_{d10} = 53.23$ |
| $r_{19} = -13.1378$ | $d_{19} = 1.0000$ | $n_{d11} = 1.84666$ | $\nu_{d11} = 23.88$ |
| $r_{20} = -38.1228$ | $d_{20} = $ (Variable) | | |
| $r_{21} = \infty$ | $d_{21} = 5.1000$ | $n_{d12} = 1.54771$ | $\nu_{d12} = 62.83$ |
| $r_{22} = \infty$ | $d_{20} = 1.2100$ | | |
| $r_{23} = \infty$ | $d_{23} = 0.6000$ | $n_{d13} = 1.48749$ | $\nu_{d13} = 70.20$ |
| $r_{24} = \infty$ | | | |

Example 3

$f = 6.90 \sim 16.42 \sim 39.00$
$F_{NO} = 1.45 \sim 1.57 \sim 1.84$
$\omega = 24.54 \sim 10.86 \sim 4.62°$

| | | | |
|---|---|---|---|
| $r_1 = 44.4464$ | $d_1 = 1.0000$ | $n_{d1} = 1.80518$ | $\nu_{d1} = 25.43$ |
| $r_2 = 23.0374$ | $d_2 = 4.9000$ | $n_{d2} = 1.60311$ | $\nu_{d2} = 60.70$ |
| $r_3 = -118.8422$ | $d_3 = 0.1500$ | | |
| $r_4 = 16.5717$ | $d_4 = 3.4000$ | $n_{d3} = 1.60311$ | $\nu_{d3} = 60.70$ |
| $r_5 = 37.9590$ | $d_5 = $ (Variable) | | |
| $r_6 = 17.5286$ | $d_6 = 0.9000$ | $n_{d4} = 1.60311$ | $\nu_{d4} = 60.70$ |
| $r_7 = 5.3293$ | $d_7 = 2.7023$ | | |
| $r_8 = -7.3853$ | $d_8 = 0.9000$ | $n_{d5} = 1.60311$ | $\nu_{d5} = 60.70$ |
| $r_9 = 8.3845$ | $d_9 = 2.0000$ | $n_{d6} = 1.80518$ | $\nu_{d6} = 25.43$ |
| $r_{10} = 44.1064$ | $d_{10} = $ (Variable) | | |
| $r_{11} = \infty$ (Stop) | $d_{11} = 1.5000$ | | |
| $r_{12} = 8.5536$ (Aspheric) | $d_{12} = 3.9000$ | $n_{d7} = 1.71300$ | $\nu_{d7} = 53.84$ |
| $r_{13} = -11.1564$ | $d_{13} = 0.2000$ | | |
| $r_{14} = 379.5741$ | $d_{14} = 0.8000$ | $n_{d8} = 1.84666$ | $\nu_{d8} = 23.88$ |
| $r_{15} = 8.4127$ | $d_{15} = $ (Variable) | | |
| $r_{16} = 10.5708$ (Aspheric) | $d_{16} = 3.200$ | $n_{d9} = 1.71300$ | $\nu_{d9} = 53.84$ |
| $r_{17} = -26.2601$ | $d_{17} = $ (Variable) | | |

Example 3-continued

| | | | |
|---|---|---|---|
| $r_{18} = \infty$ | $d_{18} = 5.1000$ | $n_{d10} = 1.54771$ | $\nu_{d10} = 62.83$ |
| $r_{19} = \infty$ | $d_{19} = 1.2100$ | | |
| $r_{20} = \infty$ | $d_{20} = 0.6000$ | $n_{d11} = 1.48749$ | $\nu_{d11} = 70.20$ |
| $r_{21} = \infty$ | | | |

Zooming Spaces

| f | 6.90 | 16.42 | 39.00 |
|---|---|---|---|
| $d_5$ | 0.800 | 8.597 | 14.097 |
| $d_{10}$ | 6.661 | 2.312 | 1.000 |
| $d_{15}$ | 1.300 | 4.751 | 10.042 |
| $d_{17}$ | 4.080 | 4.978 | 1.000 |

Zooming Spaces

| f | 6.69 | 18.40 | 50.50 |
|---|---|---|---|
| $d_5$ | 1.000 | 8.171 | 13.670 |
| $d_{10}$ | 13.670 | 6.499 | 1.000 |
| $d_{16}$ | 2.346 | 6.432 | 13.257 |
| $d_{18}$ | 1.970 | 5.055 | 3.730 |

Aspherical Coefficients

12th surface
$P = 1$
$A_4 = -0.52422 \times 10^{-3}$
$A_6 = -0.80748 \times 10^{-5}$
$A_8 = 0.83811 \times 10^{-7}$
16th surface
$P = 1$
$A_4 = -0.21782 \times 10^{-3}$
$A_6 = 0.53798 \times 10^{-5}$
$A_8 = -0.12592 \times 10^{-6}$

Aspherical Coefficients

12th surface
$P = 1$
$A_4 = -0.15301 \times 10^{-3}$
$A_6 = -0.67446 \times 10^{-6}$
$A_8 = -0.24058 \times 10^{-8}$
17th surface
$P = 1$
$A_4 = -0.18993 \times 10^{-3}$
$A_6 = -0.12992 \times 10^{-5}$
$A_8 = 0.29264 \times 10^{-7}$

Example 4

$f = 6.69 \sim 18.40 \sim 50.50$
$F_{NO} = 1.41 \sim 1.77 \sim 2.20$
$\omega = 25.21 \sim 9.72 \sim 3.57°$

| | | | |
|---|---|---|---|
| $r_1 = 59.4691$ | $d_1 = 1.0000$ | $n_{d1} = 1.78472$ | $\nu_{d1} = 25.71$ |
| $r_2 = 21.8328$ | $d_2 = 6.1000$ | $n_{d2} = 1.62230$ | $\nu_{d2} = 53.20$ |
| $r_3 = -57.8586$ | $d_3 = 0.1500$ | | |
| $r_4 = 21.2244$ | $d_4 = 3.4000$ | $n_{d3} = 1.60311$ | $\nu_{d3} = 60.70$ |
| $r_5 = 62.7365$ | $d_5 =$ (Variable) | | |
| $r_6 = 423.1262$ | $d_6 = 0.9000$ | $n_{d4} = 1.71300$ | $\nu_{d4} = 53.84$ |
| $r_7 = 9.8997$ | $d_7 = 2.1034$ | | |
| $r_8 = -9.8497$ | $d_8 = 0.8000$ | $n_{d5} = 1.71300$ | $\nu_{d5} = 53.84$ |
| $r_9 = 7.8847$ | $d_9 = 3.0000$ | $n_{d6} = 1.84666$ | $\nu_{d6} = 23.88$ |
| $r_{10} = 34.1287$ | $d_{10} =$ (Variable) | | |
| $r_{11} = \infty$ (Stop) | $d_{11} = 1.5000$ | | |
| $r_{12} = 10.3918$ (Aspheric) | $d_{12} = 4.5000$ | $n_{d7} = 1.71300$ | $\nu_{d7} = 53.84$ |
| $r_{13} = -39.9378$ | $d_{13} = 0.2000$ | | |
| $r_{14} = 10.2201$ | $d_{14} = 3.5000$ | $n_{d8} = 1.71300$ | $\nu_{d8} = 53.84$ |
| $r_{15} = -88.8859$ | $d_{15} = 0.9773$ | $n_{d9} = 1.78472$ | $\nu_{d9} = 25.71$ |
| $r_{16} = 5.6142$ | $d_{16} =$ (Variable) | | |
| $r_{17} = 8.7523$ (Aspheric) | $d_{17} = 4.2000$ | $n_{d10} = 1.48749$ | $\nu_{d10} = 70.20$ |
| $r_{18} = -30.6853$ | $d_{18} =$ (Variable) | | |
| $r_{19} = \infty$ | $d_{19} = 5.1000$ | $n_{d11} = 1.54771$ | $\nu_{d11} = 62.83$ |
| $r_{20} = \infty$ | $d_{20} = 1.2100$ | | |
| $r_{21} = \infty$ | $d_{21} = 0.6000$ | $n_{d12} = 1.48749$ | $\nu_{d12} = 70.20$ |
| $r_{22} = \infty$ | | | |

Example 5

$f = 6.69 \sim 18.40 \sim 50.54$
$F_{NO} = 1.83 \sim 2.23 \sim 2.43$
$\omega = 25.21 \sim 9.71 \sim 3.57°$

| | | | |
|---|---|---|---|
| $r_1 = 127.5416$ | $d_1 = 1.0000$ | $n_{d1} = 1.78472$ | $\nu_{d1} = 25.71$ |
| $r_2 = 22.6581$ | $d_2 = 6.1000$ | $n_{d2} = 1.62230$ | $\nu_{d2} = 53.20$ |
| $r_3 = -41.9840$ | $d_3 = 0.1500$ | | |
| $r_4 = 17.7103$ | $d_4 = 3.4000$ | $n_{d3} = 1.62230$ | $\nu_{d3} = 53.20$ |
| $r_5 = 45.8593$ | $d_5 =$ (Variable) | | |
| $r_6 = 46.3086$ | $d_6 = 0.8423$ | $n_{d4} = 1.60311$ | $\nu_{d4} = 60.70$ |
| $r_7 = 6.1788$ | $d_7 = 2.5000$ | | |
| $r_8 = -6.4674$ | $d_8 = 0.8000$ | $n_{d5} = 1.60311$ | $\nu_{d5} = 60.70$ |
| $r_9 = 9.9355$ | $d_9 = 2.9405$ | $n_{d6} = 1.84666$ | $\nu_{d6} = 23.88$ |
| $r_{10} = 103.2042$ | $d_{10} =$ (Variable) | | |
| $r_{11} = \infty$ (Stop) | $d_{11} = 1.5000$ | | |
| $r_{12} = 49.2768$ | $d_{12} = 2.4000$ | $n_{d7} = 1.51633$ | $\nu_{d7} = 64.15$ |
| $r_{13} = -21.6882$ | $d_{13} = 0.2000$ | | |
| $r_{14} = 14.6171$ | $d_{14} = 3.0000$ | $n_{d8} = 1.51633$ | $\nu_{d8} = 64.15$ |
| $r_{15} = -143.1952$ | $d_{15} = 0.2000$ | | |
| $r_{16} = 7.8174$ | $d_{16} = 4.6991$ | $n_{d9} = 1.51633$ | $\nu_{d9} = 64.15$ |

Example 5-continued

| | | | |
|---|---|---|---|
| $r_{17} = 276.0987$ | $d_{17} = 0.4717$ | | |
| $r_{18} = -52.1380$ | $d_{18} = 1.0000$ | $n_{d10} = 1.78472$ | $\nu_{d10} = 25.71$ |
| $r_{19} = 6.4186$ | $d_{19} = $ (Variable) | | |
| $r_{20} = 7.5850$ (Aspheric) | $d_{20} = 3.3000$ | $n_{d11} = 1.51633$ | $\nu_{d11} = 64.15$ |
| $r_{21} = -400.1371$ | $d_{21} = $ (Variable) | | |
| $r_{22} = \infty$ | $d_{22} = 5.1000$ | $n_{d12} = 1.54771$ | $\nu_{d12} = 62.83$ |
| $r_{23} = \infty$ | $d_{23} = 1.2100$ | | |
| $r_{24} = \infty$ | $d_{24} = 0.6000$ | $n_{d13} = 1.48749$ | $\nu_{d13} = 70.20$ |
| $r_{25} = \infty$ | | | |

Zooming Spaces

| f | 6.69 | 18.40 | 50.54 |
|---|---|---|---|
| $d_5$ | 1.000 | 8.237 | 13.667 |
| $d_{10}$ | 13.667 | 6.430 | 1.000 |
| $d_{19}$ | 3.909 | 7.228 | 13.322 |
| $d_{21}$ | 1.340 | 5.257 | 4.593 |

Aspherical Coefficients

12th surface
P = 1
$A_4 = -0.32744 \times 10^{-3}$
$A_6 = -0.85716 \times 10^{-6}$
$A_8 = -0.73694 \times 10^{-7}$

Example 6

$f = 6.69 \sim 18.40 \sim 50.55$
$F_{NO} = 1.72 \sim 2.13 \sim 2.45$
$\omega = 25.21 \sim 9.71 \sim 3.57°$

| | | | |
|---|---|---|---|
| $r_1 = 77.2217$ | $d_1 = 1.0000$ | $n_{d1} = 1.78472$ | $\nu_{d1} = 25.71$ |
| $r_2 = 24.5100$ | $d_2 = 5.7000$ | $n_{d2} = 1.60311$ | $\nu_{d2} = 60.70$ |
| $r_3 = -48.5222$ | $d_3 = 0.1500$ | | |
| $r_4 = 18.7173$ | $d_4 = 3.4000$ | $n_{d3} = 1.62230$ | $\nu_{d3} = 53.20$ |
| $r_5 = 42.8639$ | $d_5 = $ (Variable) | | |
| $r_6 = 92.6601$ | $d_6 = 0.8423$ | $n_{d4} = 1.60311$ | $\nu_{d4} = 60.70$ |
| $r_7 = 6.7565$ | $d_7 = 2.5000$ | | |
| $r_8 = -7.3626$ | $d_8 = 0.8000$ | $n_{d5} = 1.60311$ | $\nu_{d5} = 60.70$ |
| $r_9 = 10.2105$ | $d_9 = 2.5000$ | $n_{d6} = 1.84666$ | $\nu_{d6} = 23.88$ |
| $r_{10} = 95.7738$ | $d_{10} = $ (Variable) | | |
| $r_{11} = \infty$ (Stop) | $d_{11} = 1.5000$ | | |
| $r_{12} = 16.7262$ (Aspheric) | $d_{12} = 3.3000$ | $n_{d7} = 1.60311$ | $\nu_{d7} = 60.70$ |
| $r_{13} = -20.0243$ | $d_{13} = 0.4110$ | | |
| $r_{14} = 9.1322$ | $d_{14} = 3.5830$ | $n_{d8} = 1.60311$ | $\nu_{d8} = 60.70$ |
| $r_{15} = -63.3430$ | $d_{15} = 0.4364$ | | |
| $r_{16} = 44.2932$ | $d_{16} = 1.0000$ | $n_{d9} = 1.78472$ | $\nu_{d9} = 25.71$ |
| $r_{17} = 6.2434$ | $d_{17} = $ (Variable) | | |
| $r_{18} = 9.4023$ | $d_{18} = 1.0000$ | $n_{d10} = 1.60342$ | $\nu_{d10} = 38.01$ |
| $r_{19} = 6.1828$ | $d_{19} = 0.5000$ | | |
| $r_{20} = 6.8117$ | $d_{20} = 4.4000$ | $n_{d11} = 1.5163$ | $\nu_{d11} = 64.15$ |
| $r_{21} = -38.3674$ | $d_{21} = $ (Variable) | | |
| $r_{22} = \infty$ | $d_{22} = 5.1000$ | $n_{d12} = 1.54771$ | $\nu_{d12} = 62.83$ |
| $r_{23} = \infty$ | $d_{23} = 1.2100$ | | |
| $r_{24} = \infty$ | $d_{24} = 0.6000$ | $n_{d13} = 1.48749$ | $\nu_{d13} = 70.20$ |
| $r_{25} = \infty$ | | | |

Zooming Spaces

| f | 6.69 | 18.40 | 50.55 |
|---|---|---|---|
| $d_5$ | 1.000 | 8.238 | 13.668 |
| $d_{10}$ | 13.668 | 6.429 | 1.000 |
| $d_{17}$ | 3.364 | 8.092 | 14.726 |
| $d_{21}$ | 1.102 | 3.612 | 2.408 |

Aspherical Coefficients

Figure 13:
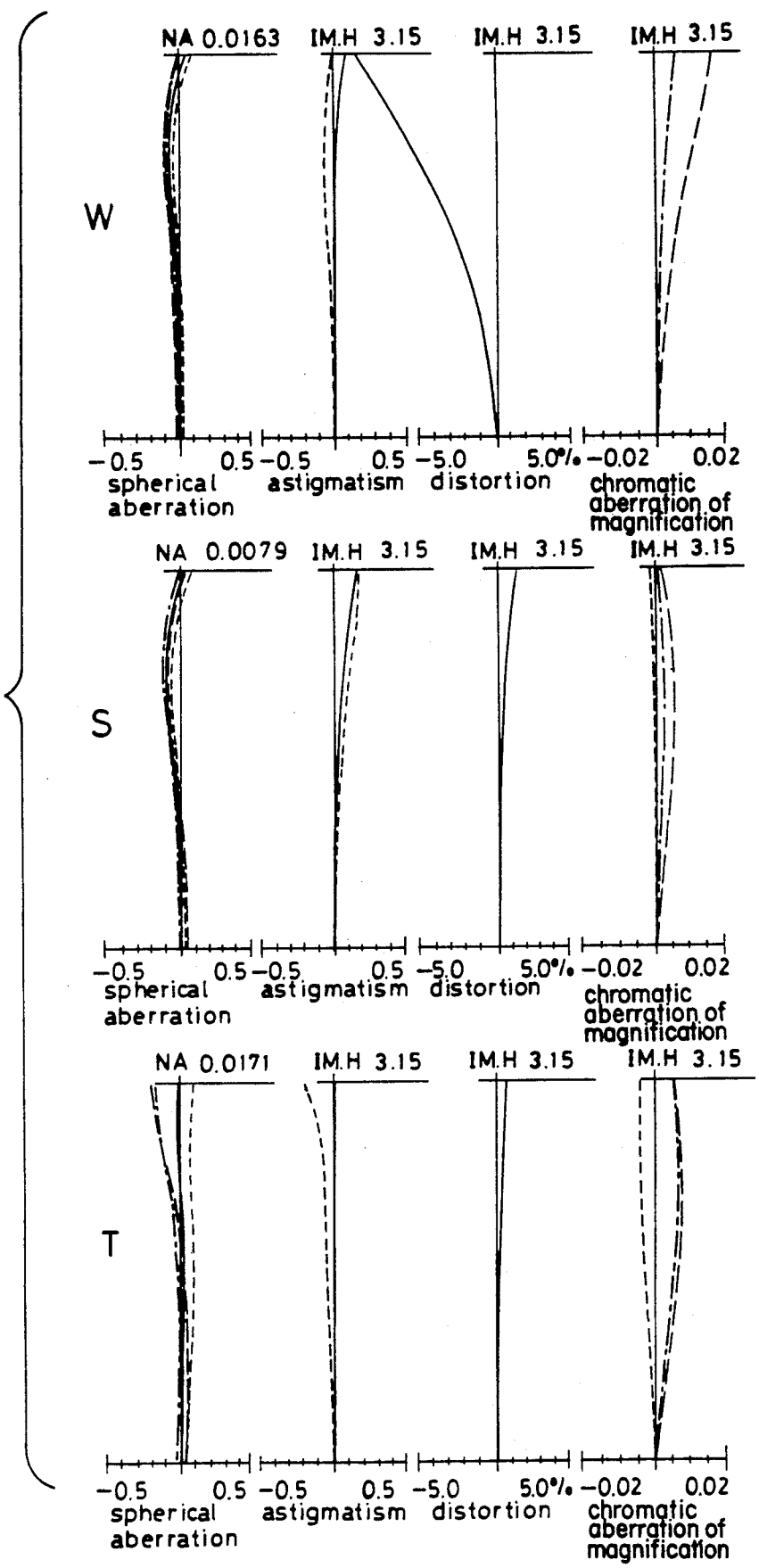
FIG. 13 is aberrational diagrams of Example 6 at the wide angle end, standard setting and telephoto end, when the distance between the first lens surface and the object is short.

12th surface
P = 1
$A_4 = -0.17924 \times 10^{-3}$
$A_6 = 0.44485 \times 10^{-6}$
$A_8 = -0.22201 \times 10^{-7}$ Aberrational diagrams of Examples 1 to 6 at the wide angle ends, standard settings and telephoto ends are shown in FIGS. 7 to 12. Aberrational diagrams of Example 6 at the wide angle end, standard setting and telephoto end, when the distance between the first lens surface and the object is short, say, −100 mm (an image-formation magnification of −0.056), −500 mm (an image-formation magnification of −0.0361) and −500 mm (an image-formation magnification of −0.0796), are also shown in FIG. 13.

Values corresponding to Conditions (1) and (3)-(5) and values of $\beta_{4S}$-Condition (2) and $\beta_{4W}$ and $\beta_{4T}$-Condition (6) in the foregoing examples are set out below.

TABLE

| Examples | 1 | 2 | 3 | 4 | 5 | 6 |
|---|---|---|---|---|---|---|
| (1) | 1.01 | 1.07 | 1.42 | 0.897 | 0.848 | 0.716 |
| (3) | 0.820 | 1.11 | 1.05 | 0.881 | 0.781 | 1.33 |
| (4) | 0.370 | 0.472 | 0.606 | 0.389 | 0.445 | 0.433 |
| (5) | 0.943 | 0.809 | 0.904 | 0.977 | 0.799 | 0.847 |
| $\beta_{4S}$ | 0.253 | 0.136 | −0.029 | 0.147 | 0.142 | 0.365 |
| $\beta_{4W}$ | 0.334 | 0.242 | 0.053 | 0.361 | 0.413 | 0.506 |
| $\beta_{4T}$ | 0.334 | 0.327 | 0.334 | 0.239 | 0.188 | 0.434 |

As can be understood from what has been described, the present invention provides a compact zoom lens system used primarily designed for video cameras, which has a variable power ratio of about 6–8 and is made up of a reduced number of, say, about 9–11, lenses.

What is claimed is:

1. A zoom lens system comprising in order from the object side a first lens unit having a positive refractive power, a second lens unit having a negative refractive power, a third lens unit having a positive refractive power and a fourth lens unit having a positive refractive power, wherein said first and third lens units are movable toward the object side for zooming from the wide angle end to the telephoto end while said second lens unit remains fixed, wherein said fourth lens unit is movable for correcting image position variations, wherein said third lens unit includes at least one positive lens element and one negative lens element with the concave surface facing said fourth lens unit, and wherein said zoom lens system satisfies the following conditions:

$$0.2 < r_{3R}/(n_{3R}-1)(f_W f_T)^{\frac{1}{2}} < 1.0 \tag{4}$$

$$0.2 < r_{4F}/(n_{4F}-1)(f_W f_T)^{\frac{1}{2}} < 2.0 \tag{5}$$

wherein:
$r_{3R}$ is the radius of curvature of the image-side surface of a negative lens in the third lens unit,
$n_{3R}$ is the refractive index of a negative lens in the third lens unit,
$r_{4F}$ is the radius of curvature of the surface of the fourth lens unit that is proximate to the object side,
$n_{4F}$ is the refractive index of the lens of the fourth lens unit that is proximate to the object size,
$f_W$ is the focal length of the overall system at the wide angle end, and
$f_T$ is the focal length of the overall system at the telephoto end.

2. A zoom lens system as claimed in claim 1, wherein said 3rd lens unit further includes at least one lens element having an aspherical surface, the positive refractive power of which decreases as it separates away from the optical axis.

3. A zoom lens system as claimed in claim 2, wherein said 3rd lens unit is made up of, in order from the object side, one positive lens and one negative lens.

4. A zoom lens system as claimed in claim 3, further satisfying the following conditions:

$$0.5 < f_3/f_4 < 2.0 \tag{1}$$

$$-0.2 < \beta_{4S} < 0.5 \tag{2}$$

$$0.4 < (r_{3F}+r_{3R})/(r_{3F}-r_{3R}) < 2.7 \tag{3}$$

wherein:
$f_3$ and $f_4$ are the focal lengths of the 3rd and 4th lens units, respectively,
$\beta_{4S}$ is the image-formation magnification of the 4th lens unit at the geometrical mean of the focal lengths at the wide angle and telephoto ends, and
$r_{3F}$ and $r_{3R}$ are the object- and image-side radii of curvature of a negative lens in the 3rd lens unit, respectively.

5. A zoom lens system as claimed in claim 2, wherein said 3rd lens unit is made up of, in order from the object side, a positive lens, a positive lens and a negative lens.

6. A zoom lens system as claimed in claim 5, further satisfying the following conditions:

$$0.5 < f_3/f_4 < 2.0 \tag{1}$$

$$-0.2 < \beta_{4S} < 0.5 \tag{2}$$

$$0.4 < (r_{3F}+r_{3R})/(r_{3F}-r_{3R}) < 2.7 \tag{3}$$

wherein:
$f_3$ and $f_4$ are the focal lengths of the 3rd and 4th lens units, respectively,
$\beta_{4S}$ is the image-formation magnification of the 4th lens unit at the geometrical mean of the focal lengths at the wide angle and telephoto ends, and
$r_{3F}$ and $r_{3R}$ are the object- and image-side radii of curvature of a negative lens in the 3rd lens unit, respectively.

7. A zoom lens system as claimed in claim 2, further satisfying the following conditions:

$$0.5 < f_3/f_4 < 2.0 \tag{1}$$

$$-0.2 < \beta_{4S} < 0.5 \tag{2}$$

$$0.4 < (r_{3F}+r_{3R})/(r_{3F}-r_{3R}) < 2.7 \tag{3}$$

wherein:
$f_3$ and $f_4$ are the focal lengths of the 3rd and 4th lens units, respectively,
$\beta_{4S}$ is the image-formation magnification of the 4th lens unit at the geometrical mean of the focal lengths at the wide angle and telephoto ends, and
$r_{3F}$ and $r_{3R}$ are the object- and image-side radii of curvature of a negative lens in the 3rd lens unit, respectively.

8. A zoom lens system as claimed in claim 1, wherein said 4th lens unit further includes at least one lens element having an aspherical surface, the positive refractive power of which decreases as it separates away from the optical axis.

9. A zoom lens system as claimed in claim 8, said 3rd lens unit is made up of, in order from the object side, a positive lens, a positive lens, a positive lens and a negative lens.

10. A zoom lens system as claimed in 9, further satisfying the following conditions:

$$0.5 < f_3/f_4 < 2.0 \tag{1}$$

$$-0.2 < \beta_{4S} < 0.5 \tag{2}$$

$$0.4 < (r_{3F}+r_{3R})/(r_{3F}-r_{3R}) < 2.7 \tag{3}$$

wherein:
$f_3$ and $f_4$ are the focal lengths of the 3rd and 4th lens units, respectively,
$\beta_{4S}$ is the image-formation magnification of the 4th lens unit at the geometrical mean of the focal lengths at the wide angle and telephoto ends, and
$r_{3F}$ and $r_{3R}$ are the object- and image-side radii of curvature of a negative lens in the 3rd lens unit, respectively.

11. A zoom lens system as claimed in claim 1, wherein said 3rd lens unit consists of, in order from the object side, one positive lens and one negative lens.

12. A zoom lens system as claimed in claim 1, wherein said 3rd lens unit is made up of, in order from the object side, a positive lens, a positive lens and a negative lens.

13. A zoom lens system as claimed in claim 1, wherein said 3rd lens unit is made up of, in order from the object side, a positive lens, a positive lens, a positive lens and a negative lens.

14. A zoom lens system as claimed in claim 1, further satisfying the following conditions:

$$0.5 < f_3/f_4 < 2.0 \qquad (1)$$

$$-0.2 < \beta_{4S} < 0.5 \qquad (2)$$

$$0.4 < (r_{3F} + r_{3R})/(r_{3F} - r_{3R}) < 2.7 \qquad (3)$$

wherein:
- $f_3$ and $f_4$ are the focal lengths of the 3rd and 4th lens units, respectively,
- $\beta_{4S}$ is the image-formation magnification of the 4th lens unit at the geometrical mean of the focal lengths at the wide angle and telephoto ends, and
- $r_{3F}$ and $r_{3R}$ are the object- and image-side radii of curvature of a negative lens in the 3rd lens unit, respectively.

15. A zoom lens system as claimed in claim 14, further satisfying the following conditions:

$$\beta_{4S} < \beta_{4W}, \text{ and } \beta_{4S} < \beta_{4T} \qquad (6)$$

wherein
- $\beta_{4S}$ is the image-formation magnification of the 4th lens unit at the geometrical mean of the focal lengths at the wide angle and telephoto ends, and
- $\beta_{4W}$ and $\beta_{4T}$ are the image-formation magnifications of the fourth lens unit at the wide angle and telephoto ends, respectively.

16. A zoom lens system as claimed in claim 1, further satisfying the following conditions:

$$\beta_{4S} < \beta_{4W}, \text{ and } \beta_{4S} < \beta_{4T} \qquad (6)$$

wherein
- $\beta_{4S}$ is the image-formation magnification of the 4th lens unit at the geometrical mean of the focal lengths at the wide angle and telephoto ends, and
- $\beta_{4W}$ and $\beta_{4T}$ are the image-formation magnifications of the fourth lens unit at the wide angle and telephoto ends, respectively.

* * * * *